United States Patent
Beckey et al.

[11] Patent Number: 5,979,013
[45] Date of Patent: Nov. 9, 1999

[54] PORTABLE BLOWER WITH NOISE REDUCTION

[75] Inventors: Thomas J. Beckey, Edina; Steven R. Porter, Burnsville; Rodney D. Lund, Blaine; Chadwick A. Shaffer, Oakdale; Steven J. Svoboda, Bloomington; Steven T. O'Brien, Brooklyn Park, all of Minn.

[73] Assignee: The Toro Company, Bloomington, Minn.

[21] Appl. No.: 09/090,481

[22] Filed: Jun. 4, 1998

Related U.S. Application Data

[63] Continuation-in-part of application No. 09/037,491, Mar. 10, 1998.

[51] Int. Cl.[6] .................................................. A47L 9/00
[52] U.S. Cl. ........................ 15/326; 15/330; 181/229
[58] Field of Search ........................ 15/326, 328, 330, 15/405; 181/229, 330

[56] References Cited

U.S. PATENT DOCUMENTS

| | | | |
|---|---|---|---|
| 3,120,876 | 2/1964 | Lirette | 181/229 |
| 3,831,223 | 8/1974 | Colt et al. . | |
| 4,421,202 | 12/1983 | Hoy . | |
| 4,435,877 | 3/1984 | Berfield . | |
| 4,446,594 | 5/1984 | Watanabe et al. . | |
| 4,508,486 | 4/1985 | Tinker . | |
| 4,533,370 | 8/1985 | Ikezaki et al. . | |
| 4,615,069 | 10/1986 | Henning | 15/326 |
| 4,651,380 | 3/1987 | Ogden . | |
| 4,665,581 | 5/1987 | Oberdorfer . | |
| 4,674,146 | 6/1987 | Tuggle et al. | 15/330 |
| 4,692,091 | 9/1987 | Ritenouor . | |
| 4,706,326 | 11/1987 | Romani | 15/330 |
| 4,773,118 | 9/1988 | Lindquist et al. | 15/326 |
| 4,828,175 | 5/1989 | Huefler et al. . | |
| 5,195,208 | 3/1993 | Yamami et al. . | |
| 5,293,664 | 3/1994 | Lim et al. . | |
| 5,365,633 | 11/1994 | Sunagawa et al. . | |
| 5,479,706 | 1/1996 | Tamano et al. . | |
| 5,502,869 | 4/1996 | Smith et al. . | |
| 5,560,078 | 10/1996 | Toensing et al. . | |
| 5,718,045 | 2/1998 | Tsukahara et al. . | |
| 5,821,473 | 10/1998 | Takahashi . | |
| 5,841,080 | 11/1998 | Iida et al. . | |

FOREIGN PATENT DOCUMENTS

| | | |
|---|---|---|
| 5-14000 | 4/1993 | Japan . |
| 8-102664 | 4/1996 | Japan . |

*Primary Examiner*—Terrence R. Till
*Attorney, Agent, or Firm*—Donald S. Trevarthen

[57] ABSTRACT

The present invention provides for noise reduction during operation of a portable blower by reducing the noise or acoustic energy escaping from the inlet of the blower housing. The noise reduction is achieved in one respect by placing sound absorbing material in a plenum attached to the inlet opening of the blower housing. Other features of the preferred plenum include louvered openings and angled engagement members to draw the plenum tightly against the blower housing.

20 Claims, 15 Drawing Sheets

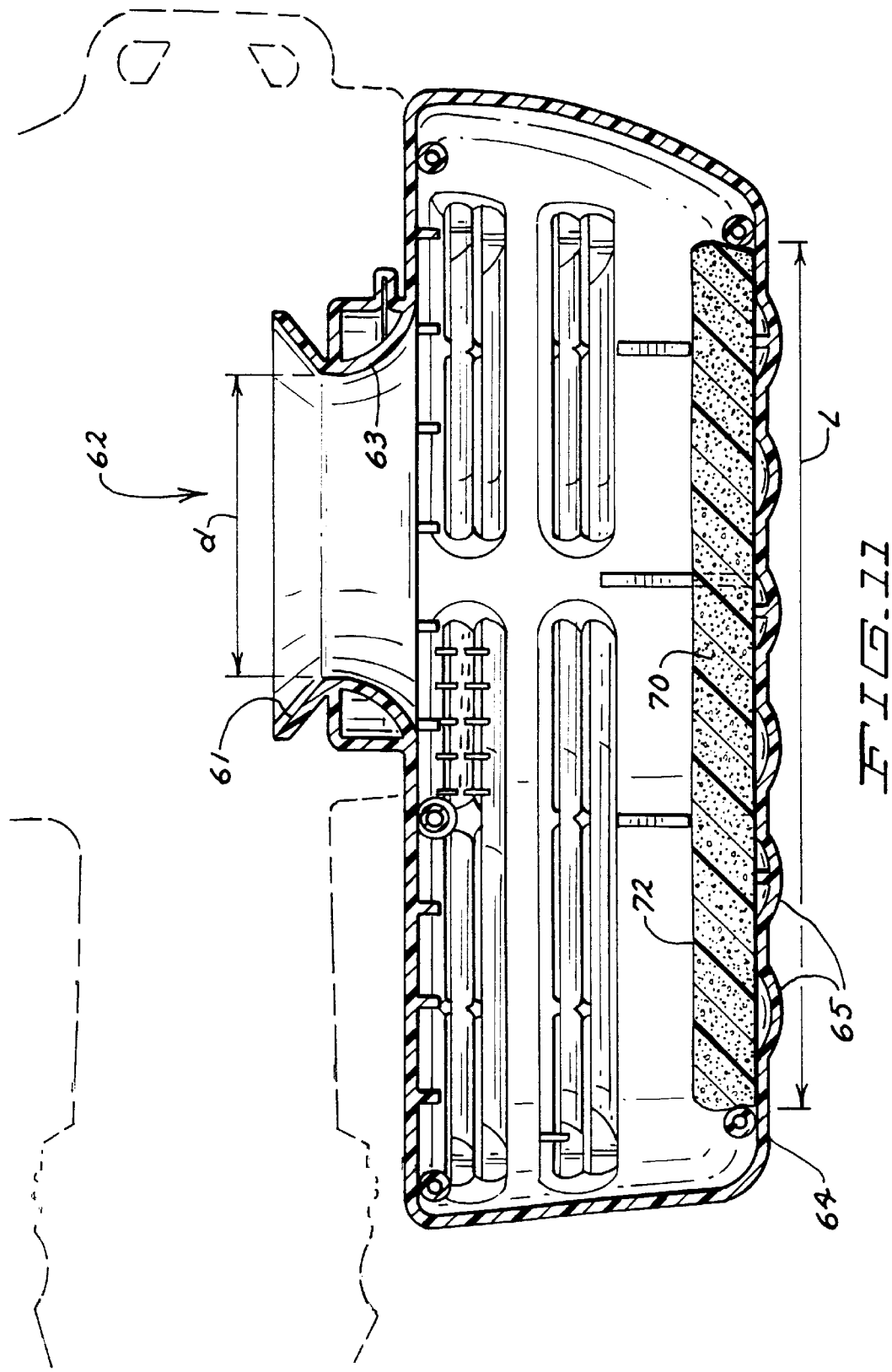

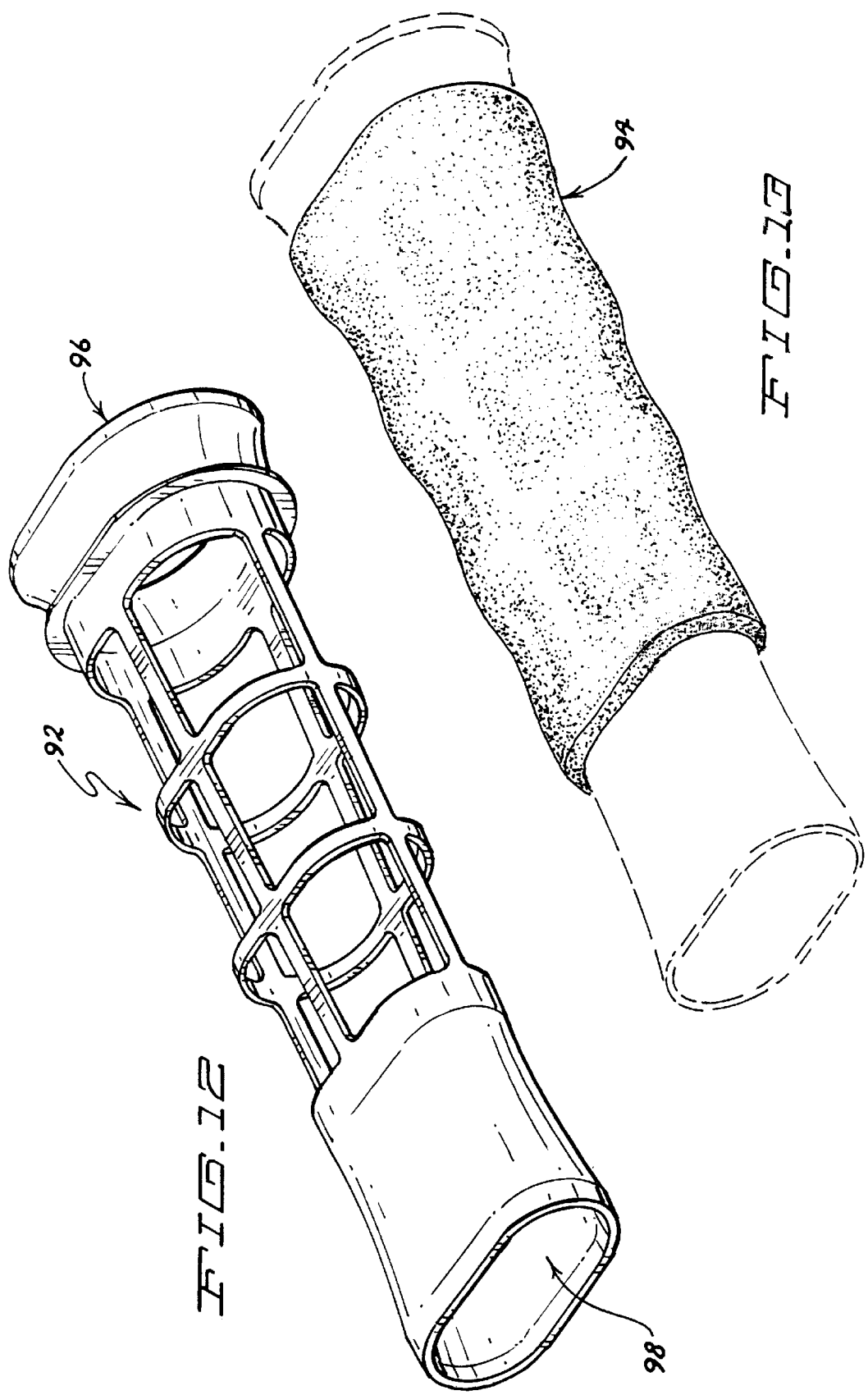

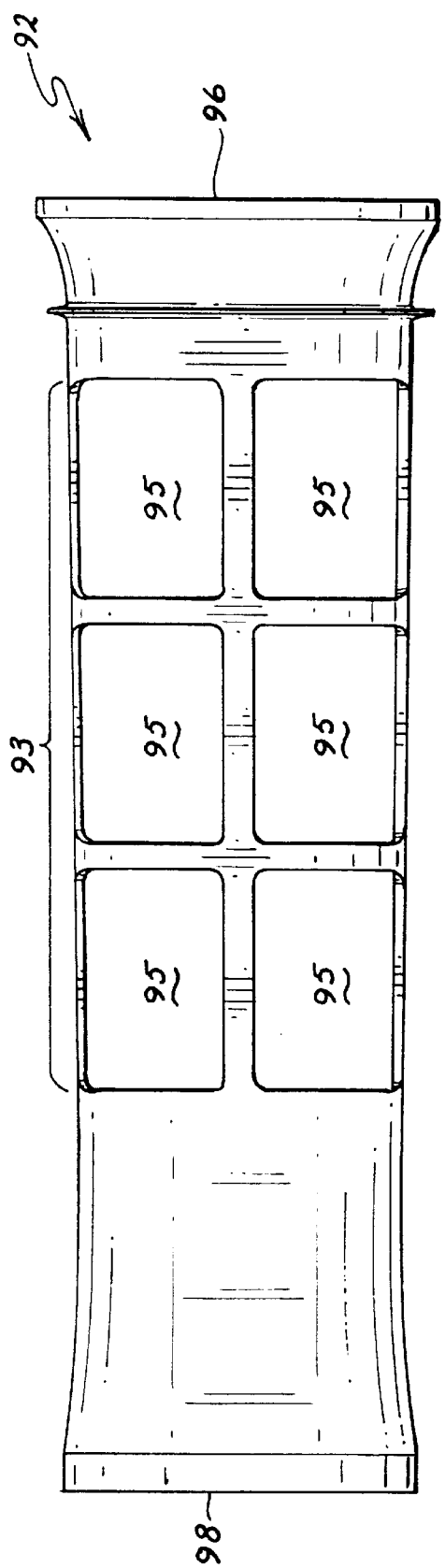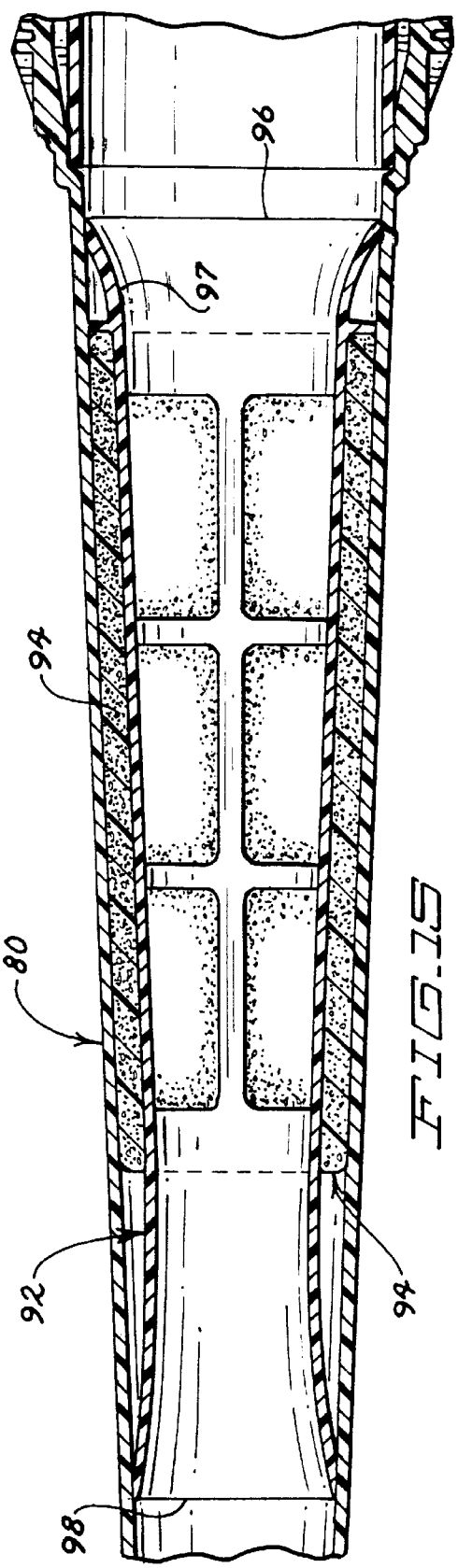

PORTABLE BLOWER WITH NOISE REDUCTION

RELATED APPLICATIONS

This application is a continuation-in-part of U.S. patent application Ser. No. 09/037,491 titled PORTABLE BLOWER WITH NOISE REDUCTION, filed on Mar. 10, 1998, which is hereby incorporated by reference in its entirety.

FIELD OF THE INVENTION

The present invention relates to the field of portable blowers. More particularly, the present invention provides a portable blower including a plenum that reduces the amount of noise or acoustic energy escaping from the inlet of the blower.

BACKGROUND OF THE INVENTION

Portable blowers are in common use by homeowners and professionals to remove debris from yards and driveways without water or other equipment such as rakes or brooms. The portable blowers can be powered by either an electric motor or a gas-powered motor. Furthermore, some of the blowers can be converted into vacuum units in which leaves or similar debris can be vacuumed into a bag or other container.

When operated as blowers, the units provide a sweeping action using a fast moving stream of air produced by an impeller rotating within the housing of the blower. The impeller draws air into the unit through an inlet and forces the air out of the unit through an outlet. An exhaust or blower tube is typically fitted over the outlet to contain the air stream to a nozzle at the end of the blower tube. The length of the blower tube typically allows a user to stand and hold the portable blower while locating the nozzle near the ground. In addition, the nozzle outlet opening is typically smaller than the outlet at the housing to increase the velocity of the air as it exits the nozzle at the end of the blower tube.

Although portable blower units provide the ability to move debris without using water, rakes, brooms, etc., they can raise issues regarding noise during use. Because the blowers are typically used outside, the noise generated by the blowers has typically been of reduced importance. With their increasing use, however, the noise generated by the blower units has been receiving heightened attention. Furthermore, the noise generated by the portable blowers is increasing as the blowers become more powerful to improve their ability to move debris.

One attempt at addressing noise generated by portable blower units disclosed in U.S. Pat. No. 5,195,208 (Yamami et al.) is directed at blowers designed to be carried on the backs of the operators. The noise produced by the blower unit is reduced by essentially placing the unit, including the motor and the blower portions, between sound absorbing sheets located on at least two sides and the rear of the unit. Although this approach may be helpful in reducing the noise generated by backpackmounted blower units, it does not address the needs of hand-held blowers, nor does it specifically address the noise generated at the inlet of air into the housing or at the exit of air from the outlet of the housing.

SUMMARY OF THE INVENTION

The present invention provides for noise reduction during operation of a portable blower by reducing the noise or acoustic energy escaping from the inlet of the blower housing.

In one aspect, the present invention provides a housing including a housing inlet and a housing outlet; an impeller mounted in the housing proximate the inlet, the impeller having a diameter, wherein rotation of the impeller about an axis of rotation draws air into the housing through the housing inlet, the air exiting the housing through the housing outlet; a plenum comprising a plenum aperture in fluid communication with the housing inlet and at least one plenum inlet opening allowing air to enter the plenum; and a sound absorbing element having a projected dimension in at least one direction perpendicular to the axis of rotation that is greater than the diameter of the impeller.

In another aspect, the present invention provides a housing including a housing inlet and a housing outlet; an impeller mounted in the housing proximate the inlet, the impeller having a diameter, wherein rotation of the impeller about an axis of rotation draws air into the housing through the housing inlet, the air exiting the housing through the housing outlet; a plenum removably attachable to the housing, the plenum including a plenum aperture in fluid communication with the housing inlet and at least one plenum inlet opening allowing air to enter the plenum, a mating surface about the plenum aperture, the mating surface defining a seal plane, at least two engagement members located about the plenum aperture, wherein at least one of the engagement members is inclined relative to the seal plane; and a sound absorbing element having a dimension in at least one direction perpendicular to the axis of rotation that is greater than the diameter of the impeller.

In another aspect, the present invention provides a housing including a housing inlet and a housing outlet; an impeller mounted in the housing proximate the inlet, the impeller having a diameter, wherein rotation of the impeller about an axis of rotation draws air into the housing through the housing inlet, the air exiting the housing through the housing outlet; a plenum including a plenum aperture in fluid communication with the housing inlet and at least one plenum inlet opening allowing air to enter the plenum; and a sound absorbing element having a projected dimension in at least one direction perpendicular to the axis of rotation that is greater than the diameter of the impeller, wherein the height of the impeller above the sound absorbing element is in a range of from about 100 millimeters to about 150 millimeters or more, and further wherein the sound absorbing element has a thickness in a range of from about 8 millimeters to about 50 millimeters.

These and other features and advantages of the articles according to the present invention are discussed more completely below in connection with illustrative embodiments of the invention.

BRIEF DESCRIPTION OF THE DRAWINGS

FIG. 9 is a rear view of the plenum of FIG. 4.

FIG. 11 is a cross-sectional view of the plenum of FIG. 7, taken along line 11—11 in FIG. 7

FIG. 12 is perspective view of one blower tube liner frame according to the present invention.

FIG. 13 is a perspective view of a sleeve of sound absorbing material mounted on the blower tube liner frame of FIG. 12 (the frame depicted in phantom).

FIG. 14 is a plan view of the blower tube liner frame of FIG. 12.

FIG. 15 is a partial cross-sectional view of a blower tube liner mounted in a blower tube as depicted in FIG. 1, the cross-section being taken along line 15—15 in FIG. 1.

DETAILED DESCRIPTION OF ILLUSTRATIVE EMBODIMENTS OF THE INVENTION

The present invention provides noise reduction for portable blowers. Preferably, the noise or acoustic energy escaping from both the inlet of air into the housing and at the outlet of air from the housing is reduced, although it will be understood that noise reduction at only the inlet or the outlet is also beneficial and within the scope of the present invention.

The desired acoustic energy frequencies of interest in connection with the present invention will preferably be those at about 20 kHz and below because those frequencies are typically audible to the human ear. A wider range of desired frequencies may, however, be considered for a variety of reasons, e.g., if the blowers will be used around animals with the ability to hear higher frequencies.

Although the present invention is described below with respect to hand-held electric blowers, it will be understood that the present invention can also be used in connection with backpack style blowers, as well as hand-held blowers. Furthermore, blowers according to the present invention can be powered by gas or electric motors.

In most aspects, one preferred portable blower of the present invention is constructed in a manner similar to the blower described in U.S. Pat. No. 5,560,078 (Toensing et al.), which is hereby incorporated by reference in its entirety. As a result, many of the construction details disclosed in that patent will not be repeated here.

Figure 1:
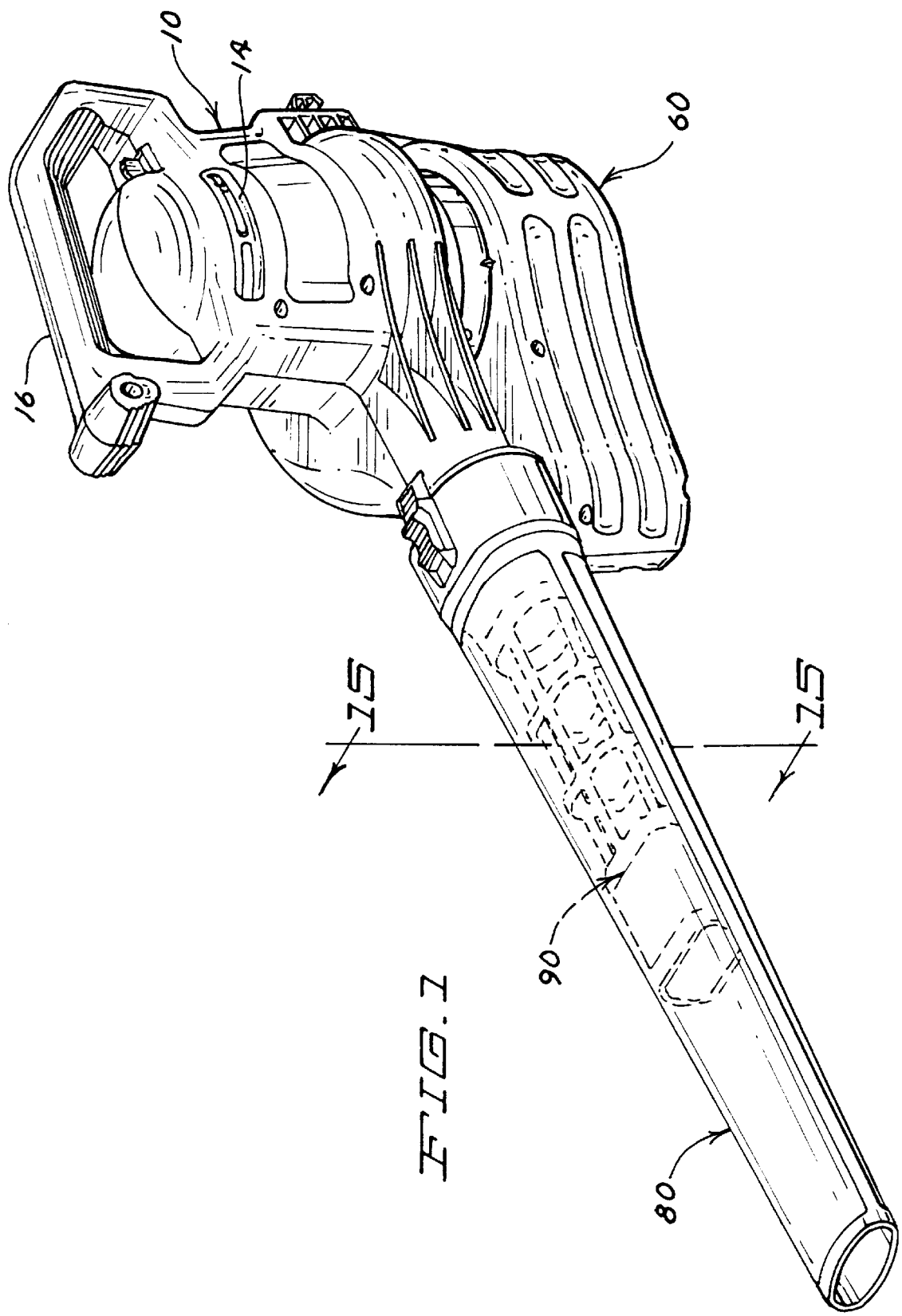
FIG. 1 is a perspective view of one portable blower according to the present invention.
Figure 2:
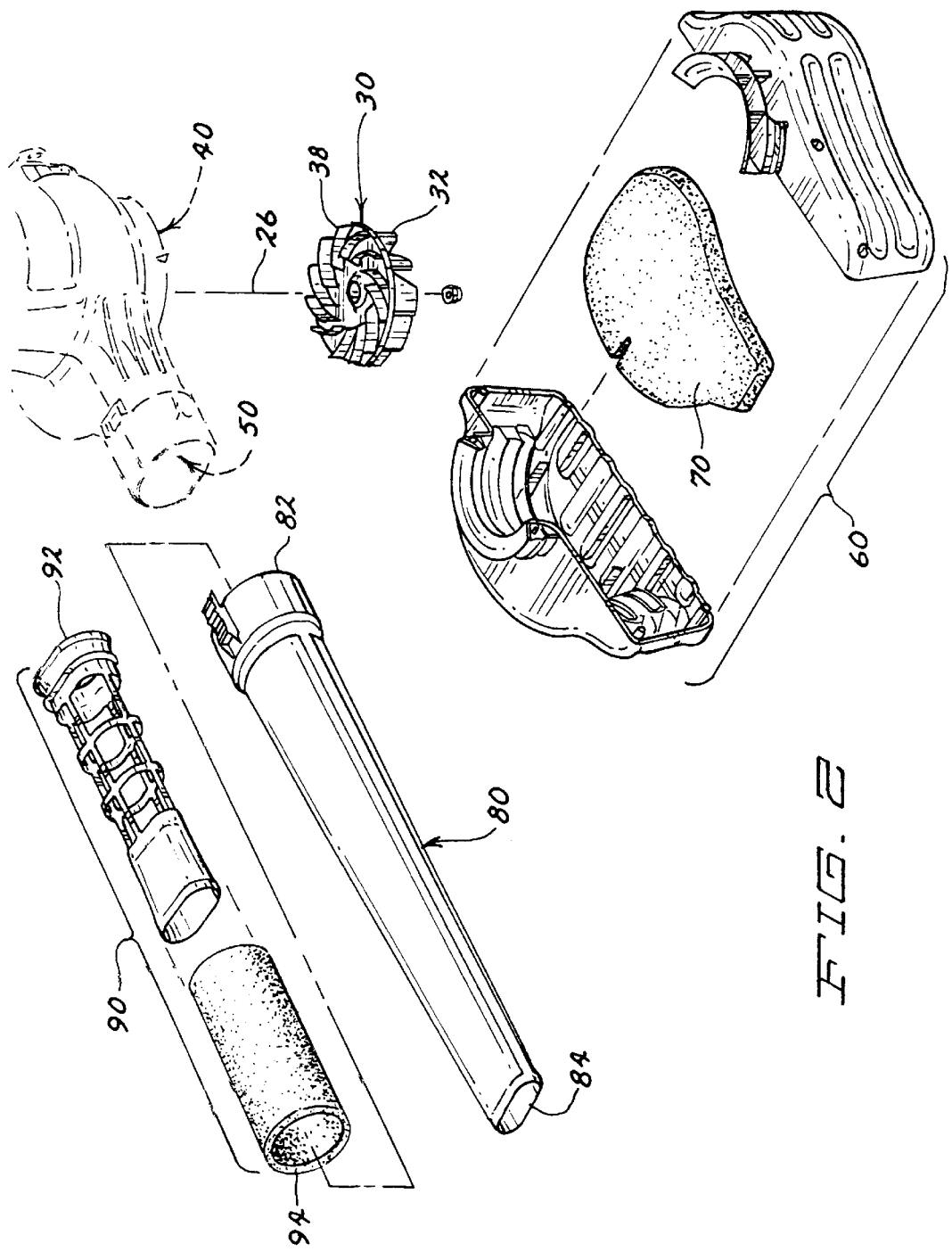
FIG. 2 is an exploded perspective view of the blower tube and plenum assemblies of the blower of FIG. 1.

FIGS. 1 and 2 illustrate one embodiment of a portable blower according to the present invention. The blower includes a housing 10 and an impeller 30 mounted for rotation within the housing 10 about axis of rotation 26 during operation. The impeller 30 preferably includes a plurality of lower blades 32 and upper blades 38 designed to move air as the impeller 30 rotates within the housing 10.

The preferred portable blowers according to the present invention are hand-held during operation and the housing 10 of the blower of FIG. 1 includes a handle 16 to facilitate operation of the blower by an operator. It will be understood, however, that the present invention could also be adapted to blowers designed for use as a "backpack" style blower.

Figure 16:
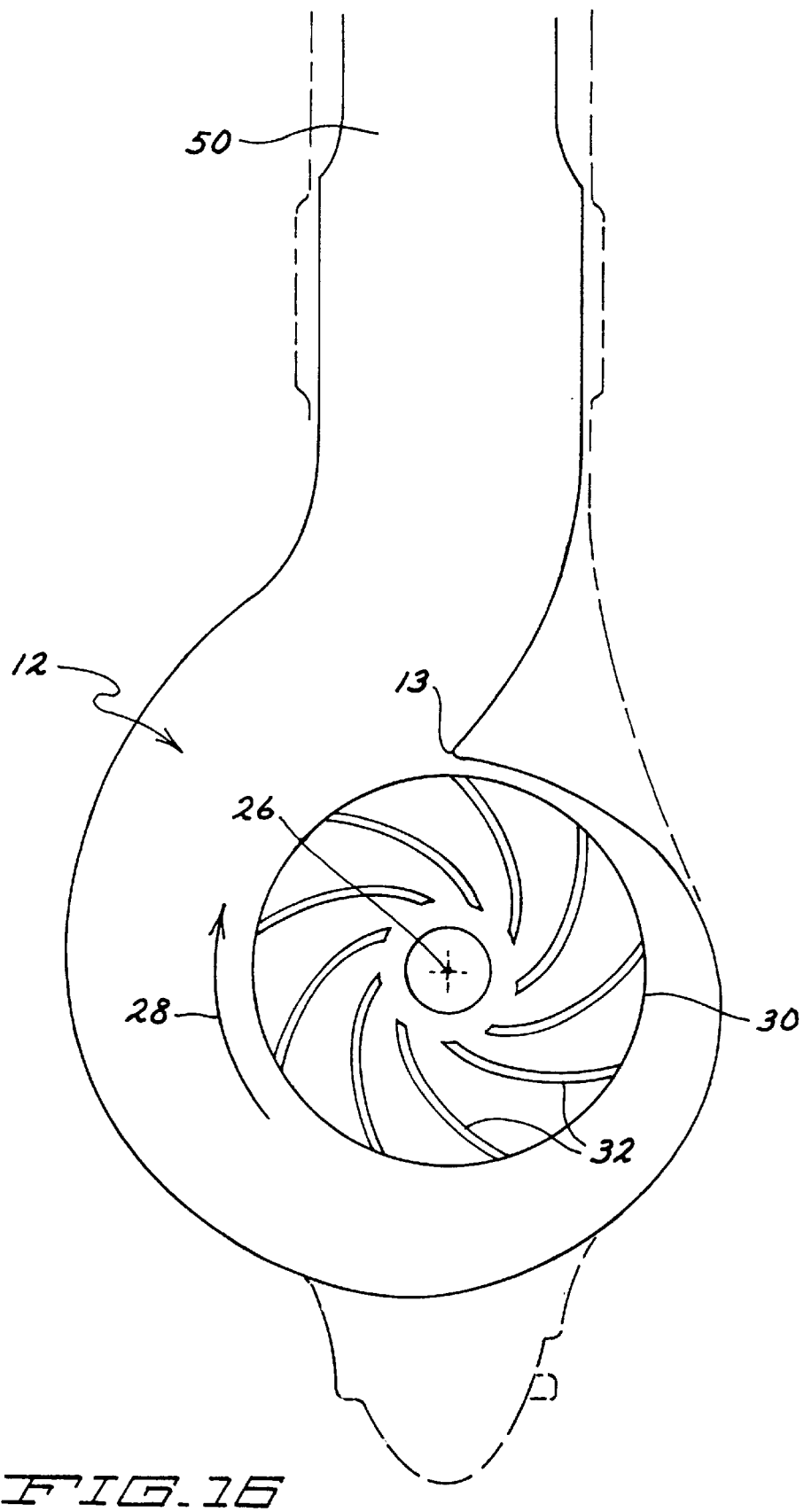
FIG. 16 is a schematic diagram illustrating operation of one impeller within the housing of a blower according to the present invention.

The housing 10 includes a housing inlet 40 located directly below the impeller 30 and an outlet 50 located generally to the side of the impeller 30. As the impeller 30 rotates during operation, air is drawn into the housing 10 through the inlet 40 and exits the housing 10 through the outlet 50. To facilitate the movement of air, the housing 10 includes a scroll 12 (see FIG. 16) about which air is moved by the impeller 30 until it reaches the outlet 50 of the housing 10, where it exits the housing 10. In other words, air is drawn into the housing 10 by the impeller 30 through the inlet 40 and moved about the scroll 12 to the outlet 50, where the air exits the housing 10.

The housing 10 also preferably includes smaller motor air inlets 14 located above the motor (not shown). During operation of the blower, air is also drawn through these inlets 14 past the motor to provide cooling during operation. The air drawn into the housing 10 through the motor air inlets 14 is also moved through the scroll 12 and exits the housing 10 through the outlet 50.

FIGS. 1 and 2 also depict a plenum 60 designed to be located over the inlet 40 of the housing 10. The plenum 60 is provided to reduce the amount of acoustic energy escaping from the housing inlet 40 by absorbing a portion of the acoustic energy escaping from the housing inlet 40 during operation of the blower. In addition, the plenum 60 also preferably manages the direction in which the acoustic energy propagates out of the plenum 60 as discussed more fully below.

Also depicted in FIGS. 1 and 2 is one preferred blower tube 80 attached to the housing 10 at the outlet 50. The blower tube 80 is preferably detachably mounted on the outlet 50 of the housing 10 as described in U.S. Pat. No. 5,560,078 (Toensing et al.) and includes an upstream end 82 adapted for attachment to the outlet 50 of the housing 10. The blower tube 80 also includes a nozzle outlet 84 through which air directed into the blower tube 80 from the housing outlet 50 exits the blower tube 80.

A blower tube liner 90 is preferably located within the blower tube 80. The liner 90 is provided to absorb acoustic energy escaping from the housing outlet 50. One preferred liner 90 illustrated in FIGS. 1 and 2 and includes a frame 92 over which sound absorbing component 94 is located. The blower tube liner 90 will be described in more detail below.

Figure 3:
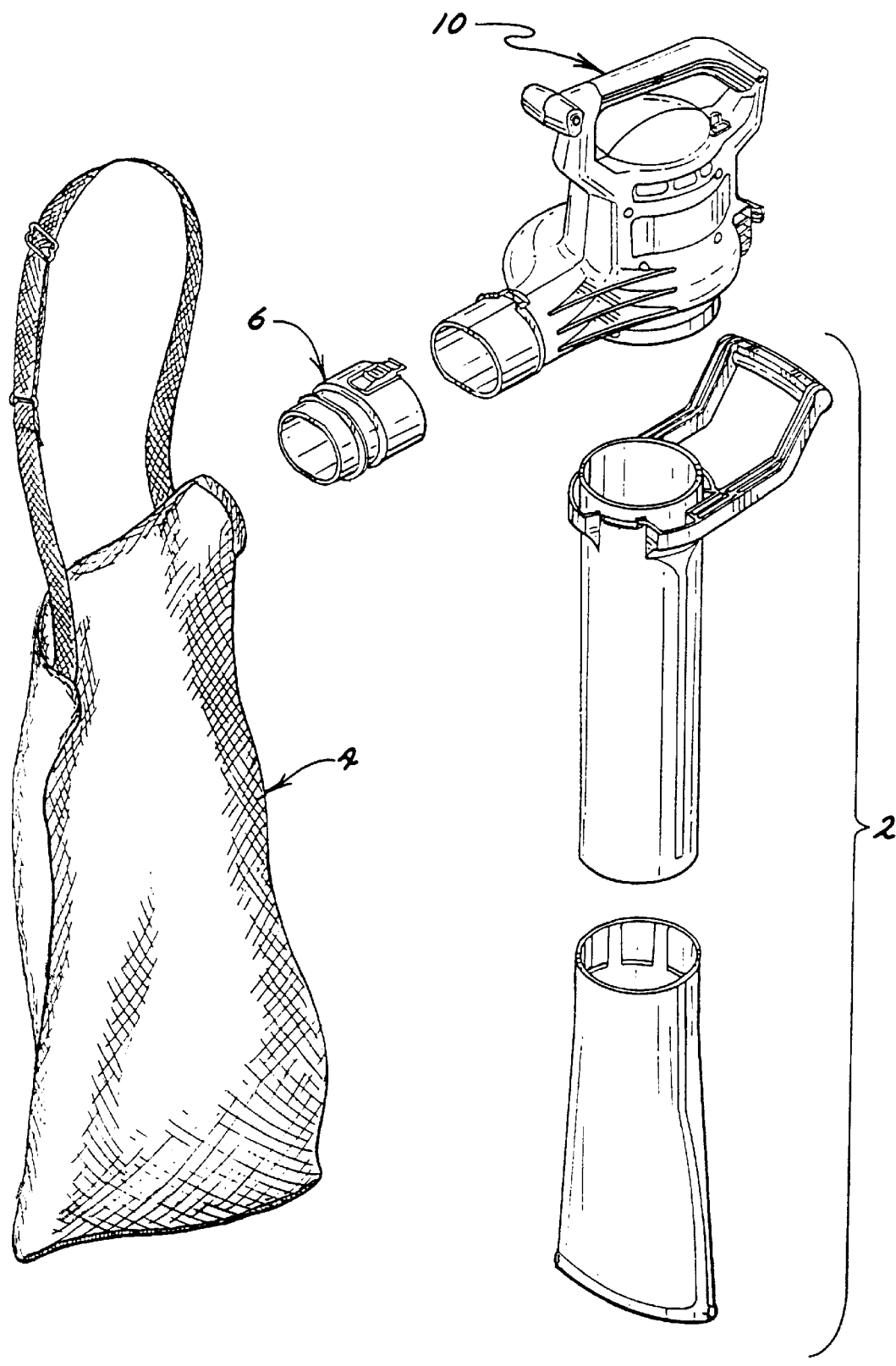
FIG. 3 is a perspective view of a portable convertible blower/vacuum assembly according to the present invention set up for operation in the vacuum mode.

It is preferred that the blowers with which the plenums and blower tubes of the present invention are used also be convertible to vacuum units as described in U.S. Pat. No. 5,560,078 (Toensing et al.). One blower is depicted after conversion into the vacuum mode in FIG. 3, where the plenum 60 and blower tube 80 are removed and replaced by a vacuum tube assembly 2 that removably attaches to the inlet 40 of the housing 10 and a vacuum bag 4 and associated collar 6 that are attached to the outlet 50 of the housing 10.

The plenum 60 of the illustrated embodiment provides one means for absorbing the acoustic energy escaping from the housing inlet 40 of the blower while the blower tube liner 90 within blower tube 80 provides one means for absorbing the acoustic energy escaping from the blower at the housing outlet 50. Together, the plenum 60 and the liner 90 provide a system for noise reduction in portable blowers, although it will be understood that either may be used alone. The use of either apparatus alone may be helpful in retrofitting existing blowers with which, e.g., the plenum 60 would be incompatible but the blower tube liner 90 would be compatible or vice versa. Using either the blower tube liner 90 or the inlet plenum 60 alone may provide a smaller noise reduction than using both devices together, but could be helpful in providing at least some reduction in the amount of noise escaping from the blower.

FIGS. 4–9 depict various views of one preferred plenum according to the present invention. The illustrated plenum 60 includes a plenum aperture 62, a bottom 64 opposite the plenum aperture 62 and a sidewall 66 surrounding the plenum aperture 62 and extending towards the bottom 64 of the plenum 60. As a result, the plenum 60 defines an interior volume.

The bottom 64 of the preferred plenum 60 includes a series of ribs 65 to provide increased stiffness and support the plenum 60 (and housing 10 if attached). It will of course be understood that the support ribs 65 are optional and that the functions of supporting the plenum 60 and providing increased stiffness could be provided using a myriad of other structures or methods.

Figure 4:
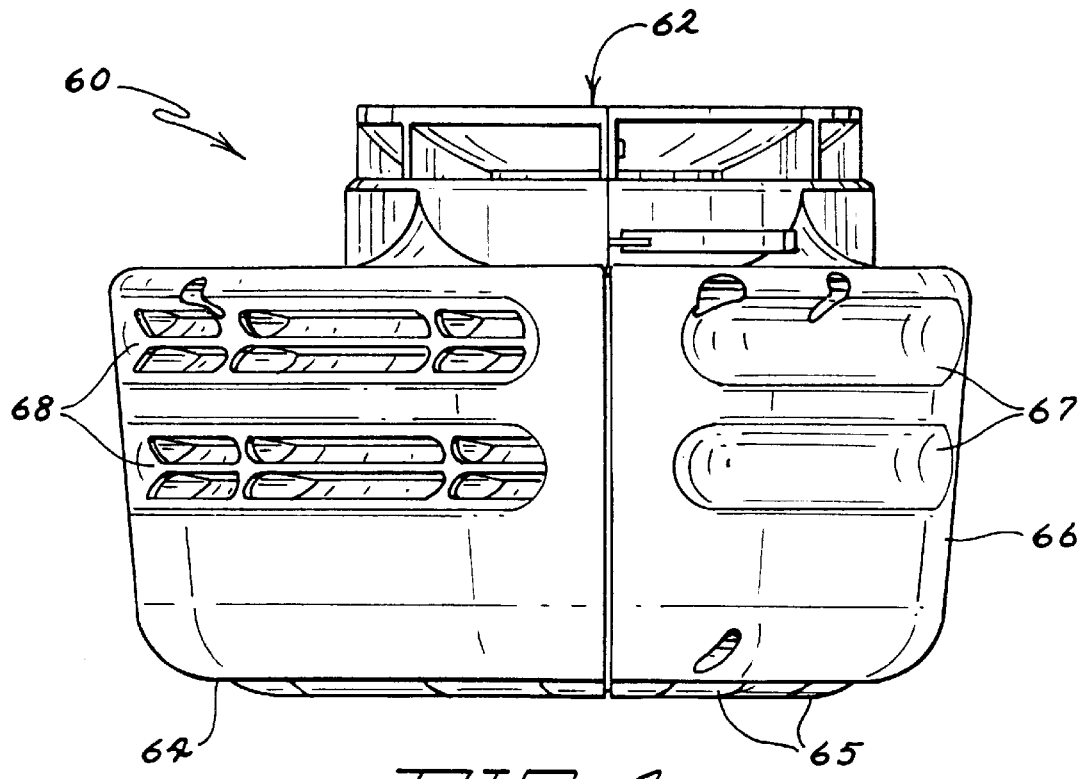
FIG. 4 is a front view of the plenum 60 attached to the blower of FIG. 1.
Figure 5:
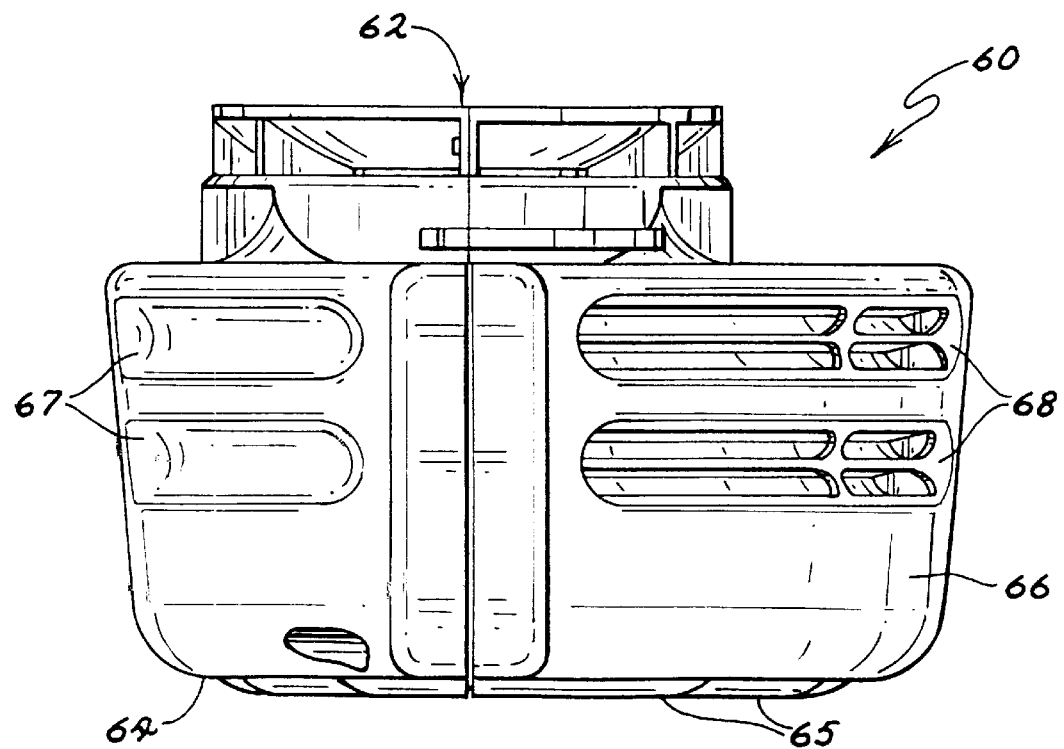
FIG. 5 is a right side view of the plenum of FIG. 4.
Figure 5:
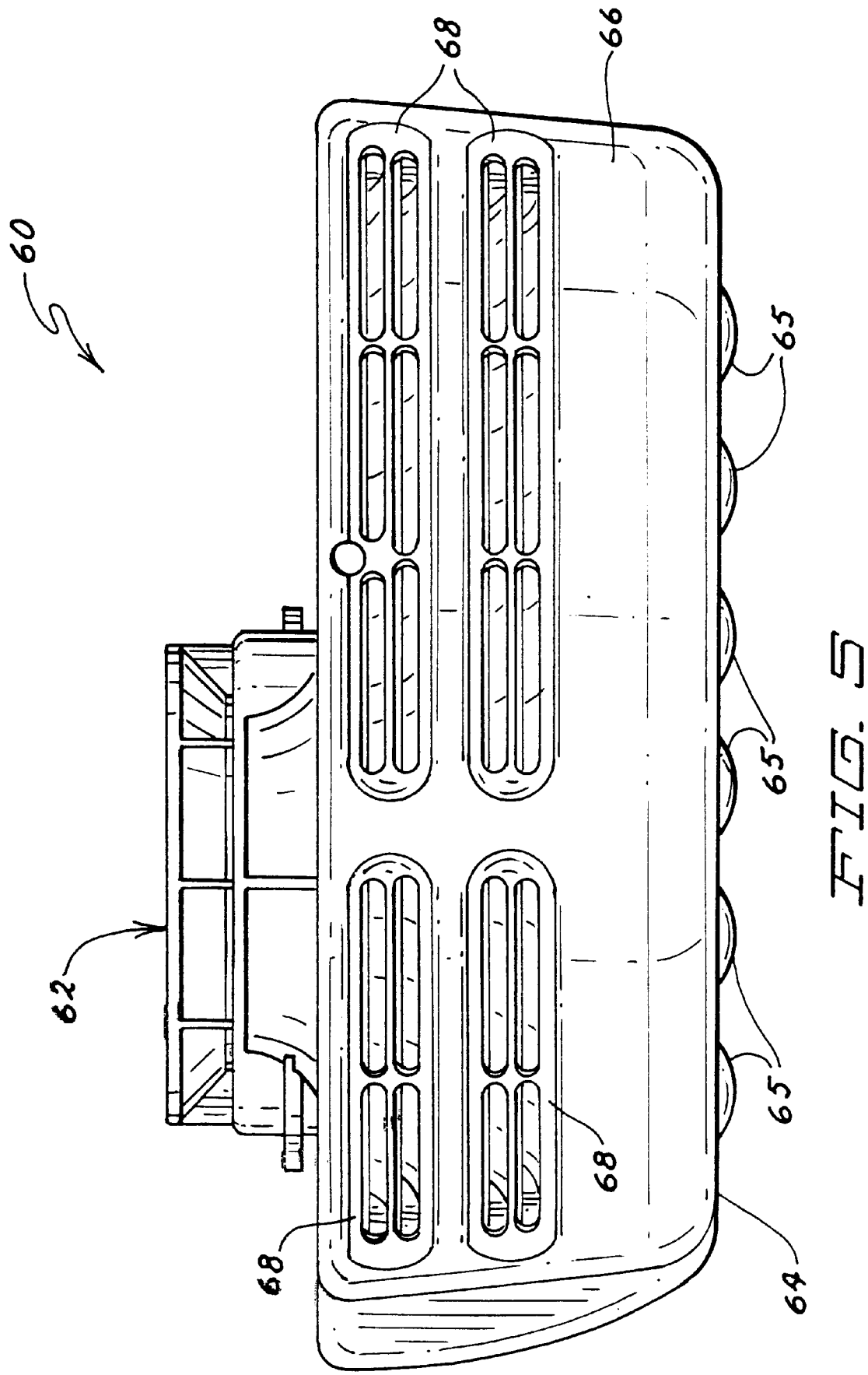

FIG. 4, 5 and 9 depict the plurality of plenum inlet openings 68 provided in the sidewall 66 of the preferred plenum 60. As a result, when the plenum 60 is attached to the housing 10 and the impeller 30 is rotated, air is drawn into the plenum 60 through the plenum inlet openings 68. From the interior volume of the plenum 60, the air is drawn through the plenum aperture 62 into the housing inlet 40 where it moves through the impeller 30 and the scroll 12 in the housing 10 and exits the scroll 12 through the housing outlet 50.

Figure 6:
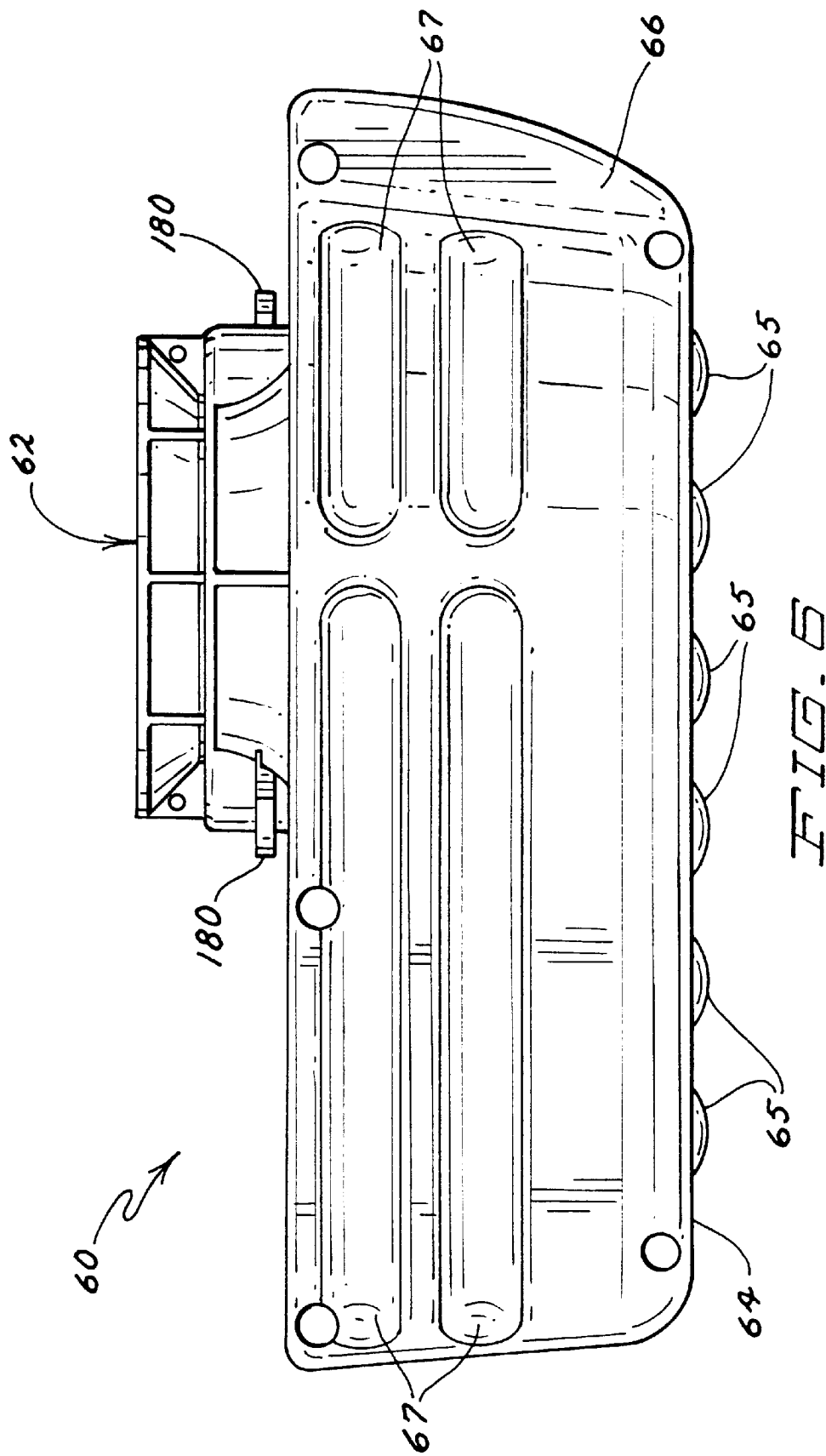
FIG. 6 is a left side view of the plenum of FIG. 4.
Figure 7:
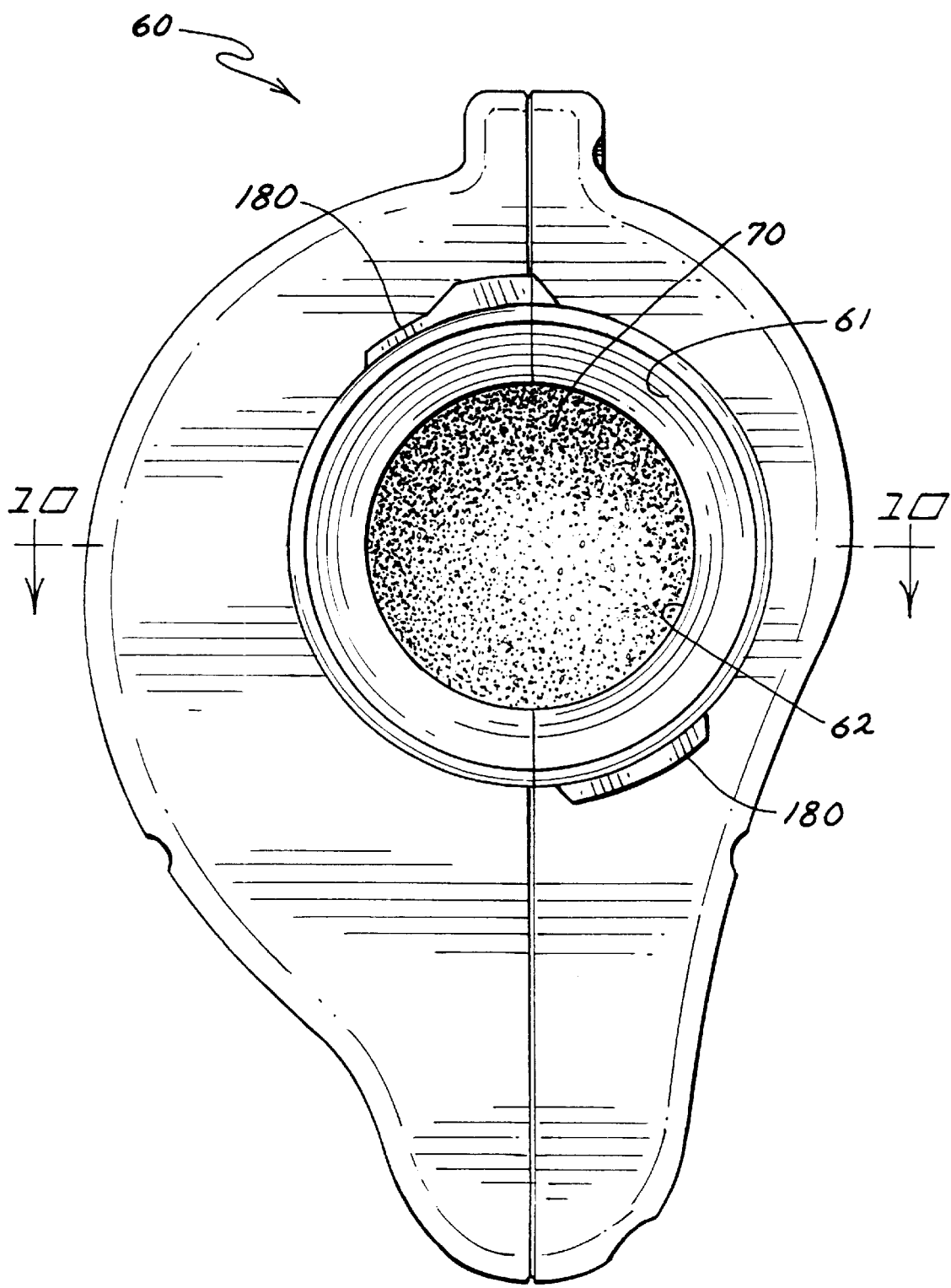
FIG. 7 is a top plan view of the plenum of FIG. 4.
Figure 8:
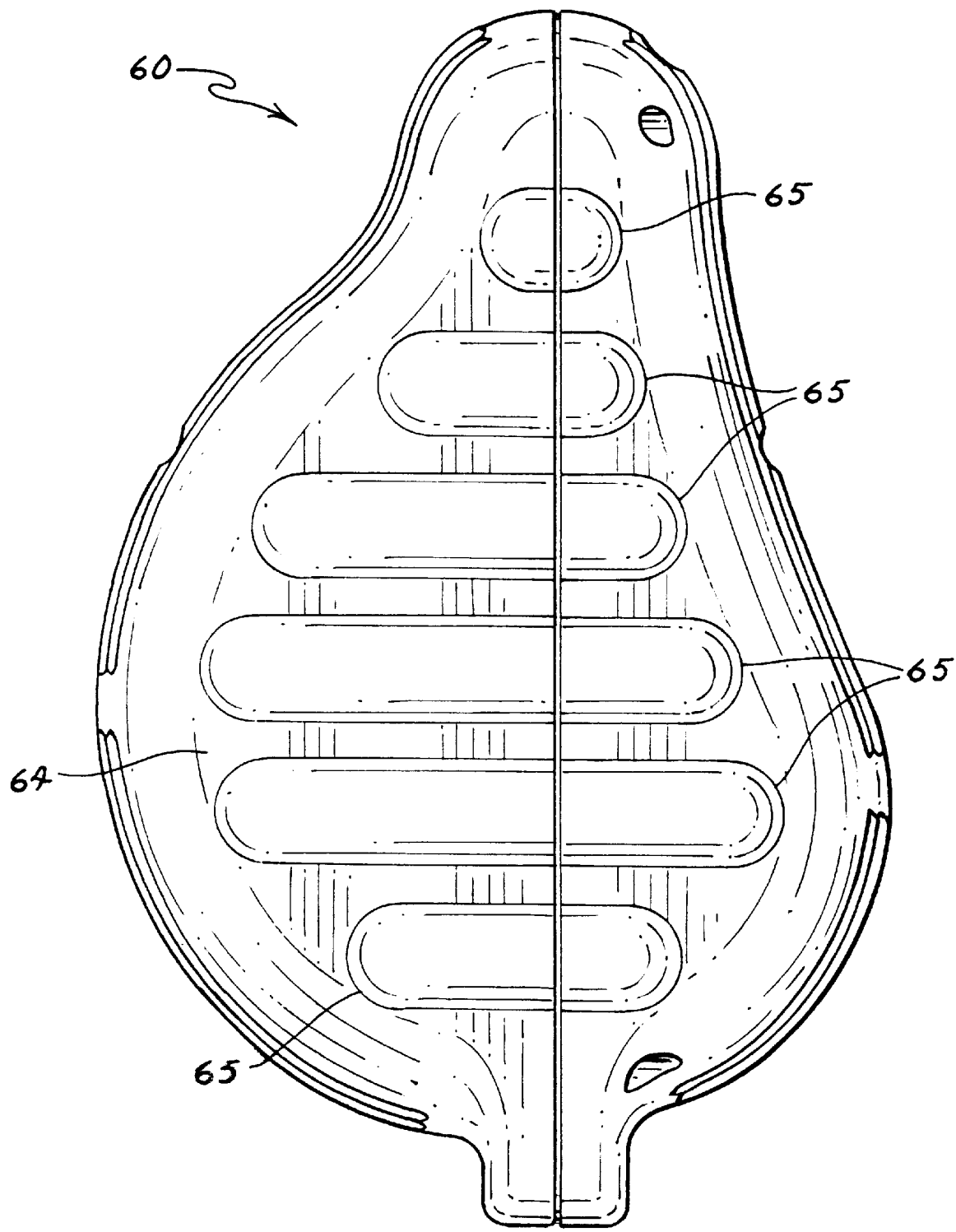
FIG. 8 is a bottom plan view of the plenum of FIG. 4.

FIG. 6 is a side elevational view of the plenum 60 depicting the sidewall 66 on the left side of the preferred plenum 60. The sidewall 66 in this view preferably includes a series of elongated depressions 67 to provide increased stiffness and rigidity to the sidewall 66.

It is preferred that the plenum 60 be removably attachable over the housing inlet opening 40 using a bayonet-style mount similar to the attachment of the vacuum tube assembly and the air inlet cover described in U.S. Pat. No. 5,560,078 (Toensing et al.).

Figure 10:
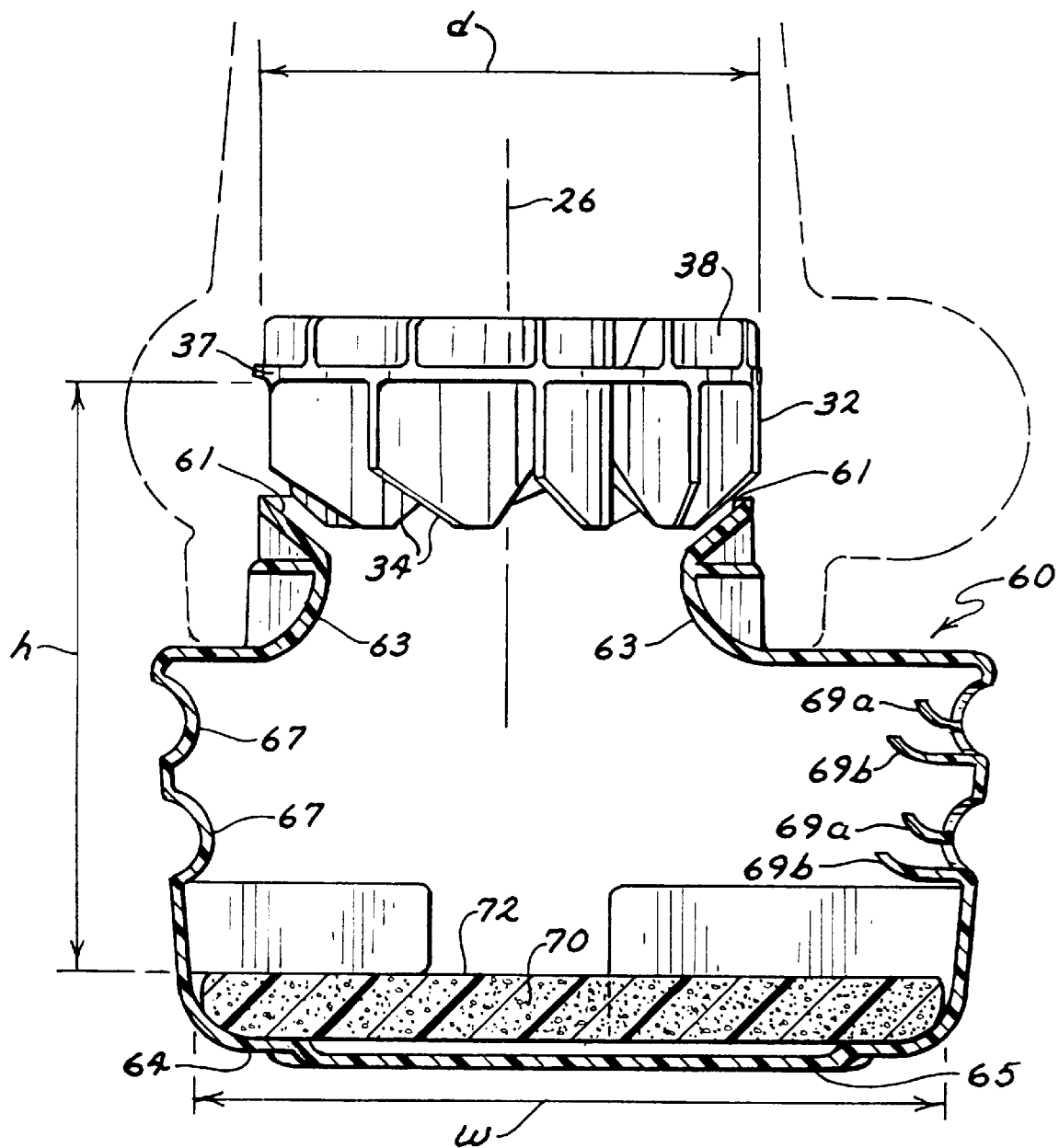
FIG. 10 is a cross-sectional view of the plenum of FIG. 7, taken along line 10—10 in FIG. 7 (the view including an impeller for illustrative purposes).

The plenum aperture 62 preferably includes a pressure ring 61 adapted to follow the profile of the impeller blades 32 on the impeller 30. That blade profile and cooperating pressure ring 61 are best seen in FIG. 10, a cross-sectional view of the plenum 60 taken along line 10—10 in FIG. 7. The view in FIG. 10 includes the impeller 30 to help illustrate the relationship between the plenum aperture 62, pressure ring 61 and the impeller 30.

The preferred impeller 30 includes lower blades 32 with a lower outside edge 34 that is angled with respect to the axis of rotation 26 about which the impeller 30 rotates during operation. It is that blade profile which the pressure ring 61 is provided to match. By matching the blade profile, the pressure ring 61 improves the efficiency of the impeller 30 when the plenum 60 is located over the inlet 40 of the housing 10. Essentially, the pressure ring 61 reduces the amount of air that leaks or spills over from the high pressure side of the impeller blades 32. As a result, the efficiency of the impeller 30 is improved. In other words, the output air horsepower of the impeller 30 is increased for a given motor output (shaft) horsepower.

The preferred impeller 30 includes nine lower blades 32 extending from the plate 37 and facing downwards towards the housing inlet 40 when assembled into the housing 10 (see FIGS. 2 and 10). The impeller 30 also preferably includes twelve shorter blades 38 on the opposite side of the plate 37 from the larger blades 32. These blades 38 preferably face the upwards towards the motor (not shown) when assembled into the housing 10 (see FIGS. 2 and 10).

Another feature of the preferred plenums 60 illustrated in FIG. 10 is the bell mouth 63 provided at the entrance to the plenum aperture 62 from the interior volume of the plenum 60. The smooth contour of the bell mouth 63 reduces turbulence in the airflow through the plenum aperture 62. That reduced turbulence also reduces the acoustic energy generated by the air flowing through the plenum aperture 62, thereby further reducing the noise generated by the blower during operation. The bell mouth 63 may also improve the efficiency of the blower by reducing the flow resistance in the air supply to the impeller 30.

Also depicted in FIG. 9, each of the preferred plenum inlet openings 68 includes a pair of louvers 69a and 69b (referred to generally as louvers 69) oriented to direct acoustic energy that does exit from the openings 68 generally downwards, i.e., away from the plenum aperture 62. In the preferred plenums 60, it will be understood that only a portion of the acoustic energy exiting from the housing inlet 40 escapes from the plenum 60.

Each pair of louvers 69 preferably includes an upper louver 69a and a lower louver 69b. The lower louver 69b of each pair of louvers 69 preferably extends further into the interior of the plenum 60 than the upper louver 69a. In the preferred plenums 60 for use with a hand-held blower as depicted in FIGS. 1 and 2, the louvers 69 preferably direct at least a portion of the acoustic energy that does escape from the plenum inlet openings 68 towards the ground, where it may be absorbed or diffusely reflected (which can diminish the intensity of the acoustic energy experienced by the operator and/or others). In addition, by providing a lower louver 69b that extends further into the plenum 60 than the upper louver 69a (in each pair of louvers 69), a significant portion of the acoustic energy reflected from the bottom of the plenum 60 is preferably prevented from passing directly through the plenum inlet openings 68 after reflection from the bottom of the plenum 60.

Another feature of the preferred plenum 60 is that the plenum inlet openings 68 are located on the right side and/or rear portion of the plenum sidewall 66 as best seen in FIGS. 4–9. As a result, when the plenum 60 is used on a hand-held blower grasped in the operator's right hand, a significant portion of the acoustic energy is directed away from the operator (which can reduce the intensity of the acoustic energy as perceived by the operator).

One preferred embodiment of a plenum 60 according to the present invention includes a sound-absorbing element 70 located within the volume defined by the plenum 60. As illustrated in FIGS. 2, 10, and 13, the sound absorbing element 70 is preferably located opposite from and facing the plenum aperture 62 (and, therefore, the housing inlet 40 and impeller 30). In the depicted embodiment, the element 70 is located proximate the bottom 64 of the plenum 60.

It is preferred that the sound absorbing element 70 be larger than the impeller 30 to assist in capturing the acoustic energy escaping from the housing inlet 40. By larger, it is meant that the sound absorbing element 70, when projected onto a plane that is perpendicular to the axis of rotation 26, has a projected dimension in at least one direction on that plane that is larger than the diameter of the impeller 30. By providing a sound absorbing element 70 that is larger than the impeller 30, the sound absorbing element 70 may capture an increased amount of acoustic energy as it expands or spreads outward from the impeller 30 through the plenum aperture 62.

In the illustrated embodiment, it may be preferred that the projected dimension (represented by the width (w) in FIG. 10) of the sound absorbing element 70 be at least about 1.5 times the diameter of the impeller 30. It may further be preferred that, for oblong sound absorbing elements such as illustrated element 70, the sound absorbing element 70 have, in projected dimensions, a width (w) of at least about 1.5 times the diameter of the impeller 30 and a length (l) that is at least about 2 times the diameter of the impeller 30.

The height h of the impeller from the sound absorbing element 70 to the upper edge of the impeller blades 32 at the outside diameter of the impeller 30 (see FIG. 10) is preferably about 100 millimeters (about 4 inches) or more, more preferably about 125 millimeters (about 5 inches) or more. The height h is preferably limited to about 25 centimeters (10 inches) or less.

The sound absorbing element 70 may have any desired thickness, provided that it does not significantly impede the flow of air through the plenum aperture 62 to the impeller 30. Preferably, the sound absorbing element 70 has a thickness of about 8 millimeters (⅜ inches) or more, more preferably about 12 millimeters (about 0.5 inches) or more, and even more preferably about 20 millimeters (about 0.75 inches) or more. The thickness of the element 70 is preferably about 50 millimeters (about 2 inches) or less, even more preferably about 38 millimeters (about 1.5 inches or less).

It will be understood that the size of the sound absorbing element 70, the height of the impeller 30 from the sound absorbing element 70, and the thickness of the sound absorbing insert 70 may be related. In one aspect, as the height of the impeller 30 from the sound absorbing element 70 is increased, it may be preferred that the size of the sound absorbing element 70 also increase. One preferred combination of height of the impeller 30 from the sound absorbing element 70, size of the sound absorbing element 70 and thickness of the sound absorbing element 70 is a height h of from about 100 millimeters to about 150 millimeters in combination with a sound absorbing element 70 having a projected dimension of at least about 1.25 times the diameter of the impeller 30 and a thickness in a range of from about 8 millimeters to about 50 millimeters.

The sound absorbing element 70 can be made from any material capable of absorbing sound such as foams, nonwovens, fabrics, etc. One preferred sound absorbing material is an open cell foam material, e.g., a polyurethane (ester-based) open cell foam having a density of 2 pounds per cubic foot (32 kilograms per cubic meter). The thickness of one preferred foam sound absorbing element 70 is about 0.75 inches (19 millimeters).

Although the preferred sound absorbing element 70 is a separate body removably located within the volume of the plenum 60, it will be understood that the sound absorbing element 70 could alternatively be fixedly attached to the plenum 60. Also, the sound absorbing element 70 could be provide integral with the plenum 60, e.g., insert molded, glued, welded, etc.. In another example, the plenum 60 could be manufactured of a material in which the density of the material in the bottom 65 of the plenum 60 is varied to enhance the ability of the material to absorb acoustic energy at desired frequencies.

The present invention also provides a blower tube that absorbs at least a portion of the acoustic energy exiting from the blower, particularly the acoustic energy exiting from the blower through the housing outlet 50. Because the blower tube must function to contain and direct the airflow exiting through the housing outlet 50 and absorb acoustic energy, while also withstanding the rigors of normal use, preferred blower tubes according to the present invention may be manufactured from two or more different components. One of the components (a structural component) may provide structural and other desired properties to the blower tube while another component (a sound absorbing component) may exhibit the ability to absorb more acoustic energy at desired frequencies than the structural component. It may be desirable to include more than one sound absorbing component, particularly if different sound absorbing components are tuned to absorb acoustic energy at different frequencies.

The structural and sound absorbing components may be arranged within the blower tube in any desirable manner. It will be understood that the structural and sound absorbing components could be, e.g., coinjected, coextruded, overmolded, insert molded, etc., such that the structural and sound absorbing components were provided integral with each other. The sound absorbing component may be exposed to the interior of the blower tube, it may be encapsulated within the walls of the blower tube, it may be located on the exterior of the blower tube, or it may be provided in a number of locations on or within the structure of the blower tube. Furthermore, the structural and sound absorbing components could be provided separately and either permanently or removably secured together.

In another variation, the structural and sound absorbing components could be chemically similar but possess different physical properties that affect their relative abilities to absorb acoustic energy of the desired frequencies, e.g., they could differ in density, stiffness, etc. Other variations in the construction of blower tubes according to the present invention will be described with reference to one preferred embodiment described below in connection with the figures.

Regardless of the structural and sound absorbing components used or their arrangement, the blower tubes according to the present invention will function to contain and direct the airflow exiting through the housing outlet 50 and absorb acoustic energy, while also withstanding the rigors of normal use.

One preferred blower tube 80 is depicted in FIGS. 1 and 2 includes an upstream end 82 and a nozzle 84 at the opposite end. It is preferred that the blower tube 80 taper along at least a portion of its length from the upstream end 82 to the nozzle 84 to increase the velocity of air moving through the blower tube 80 from the outlet 50 of the housing 10. For a more detailed description of the preferred blower tube 80 construction, reference is made to the blower tube discussion in U.S. Pat. No. 5,560,078 (Toensing et al.). The preferred blower tube 80 is manufactured from a structural component.

The blower tube 80 includes a blower tube liner 90 located in the blower tube 80 as illustrated in FIGS. 1 and 2. The liner 90 is preferably sized for insertion into the upstream end 82 of the blower tube and is maintained in position nearer to the upstream end 82 of the blower tube 80 by interference as the cross-sectional area of the blower tube 80 decreases due to its taper. It will, however, be understood that the liner 90 could be located anywhere along the path of the air exiting from the housing, including, e.g., within the outlet 50 of the housing. Furthermore, although the blower tube 80 is depicted as being separate from the housing 10, it may be formed integral with the housing 10, in which case the blower tube 80 could be an integral extension of the outlet 50.

One preferred blower tube liner 90 is depicted in more detail in FIGS. 12–15. The blower tube liner 90 includes a liner frame 92 and a sleeve 94 of a sound absorbing material that functions as the sound absorbing component. The sleeve 94 is preferably retained on the liner frame 92 by friction, although it may be desirable to use adhesives, mechanical fasteners etc. to retain the sleeve 94 in the desired position on the liner frame 92.

It is preferred, but not required, that the blower tube liner 90 be removable from the blower tube 80. By providing the blower tube liner 90 as a removable unit, existing blower tubes 80 can be retrofitted to include a blower tube liner 90. In addition, the blower tube liner 90 or portions thereof (such as the sleeve 94) can be more easily replaced if the blower tube liner 90 is removable.

Liner frame 92 includes an upstream end 96 and downstream end 98. It is preferred that the upstream end 96 be provided with a bell mouth 97 to reduce turbulence in the airflow entering the volume defined by the frame 92. That reduced turbulence can reduce the acoustic energy that could be produced by more turbulent airflow. The downstream end 98 of the frame is preferably flared to also reduce acoustic energy generated within the blower tube 80 by reducing flow separation as air moves out of the blower tube liner 90.

The portion 93 of the liner frame 92 preferably includes a plurality of openings 95 that expose a significant amount of the inner surface of the sleeve 94 to the air passing through the blower tube 80 during operation. It will be understood that the openings 95 provided in the portion 93 of the preferred liner frame 92 represent only one example and that a liner frame could be provided with openings in any desired configuration provided they expose sufficient surface area of the sleeve 94 while preserving an open passageway through the blower tube liner 90. For example, some sound absorbing materials may possess enough inherent structural stiffness so as to require little or no support in the central portion 93 of the liner 90.

It is preferred that the sound absorbing material be provided in the form of a sleeve 94. The sleeve 94 can be made from any material capable of absorbing sound at the desired frequencies such as foams, nonwovens, fabrics, etc. One preferred sound absorbing material is an open cell foam material, e.g., a polyurethane (esterbased) open cell foam having a density of 2 pounds per cubic foot (32 kilograms per cubic meter). The preferred thickness of the foam is about 0.25 inches (6 millimeters).

Although it is preferred that the sound absorbing material be provided in the form of a sleeve 94 extending around the inside circumference of the blower tube 80, it will be understood that the sound absorbing material could be provided in sheet form or any other suitable shape, provided that at least a portion of the blower tube 80 be lined with sound absorbing material. It is preferred that the length of the central portion 93 of the liner frame, i.e., the length of the sound absorbing material exposed to the air passing through the blower tube 80, be about 15 centimeters or more. It may also be preferred that the length of the sound absorbing material exposed to air passing through the blower tube 80 be about 30 centimeters or less.

The entire inside circumference of the blower tube 80 need not be lined with sound absorbing material. For example, it may be advantageous to provide sound absorbing material on only the top and/or bottom surface of a blower tube 80. In another alternative, it may be helpful to provide sound absorbing material on the exterior of the blower tube 80.

Although the sound absorbing material of the sleeve 94 is disclosed as being held within the blower tube 80 by the liner frame 92, it will be understood that a separate liner frame 92 may not be required at all. For example, the interior of the blower tube 80 itself could be lined with an appropriate amount of sound absorbing material in a desired shape. The sound absorbing material could be permanently attached to the blower tube 80, or it could be removable. In another variation, the entire longitudinal length of the blower tube 80 may be lined with sound absorbing material that is either fixedly attached to the blower tube or removable.

Figure 17:
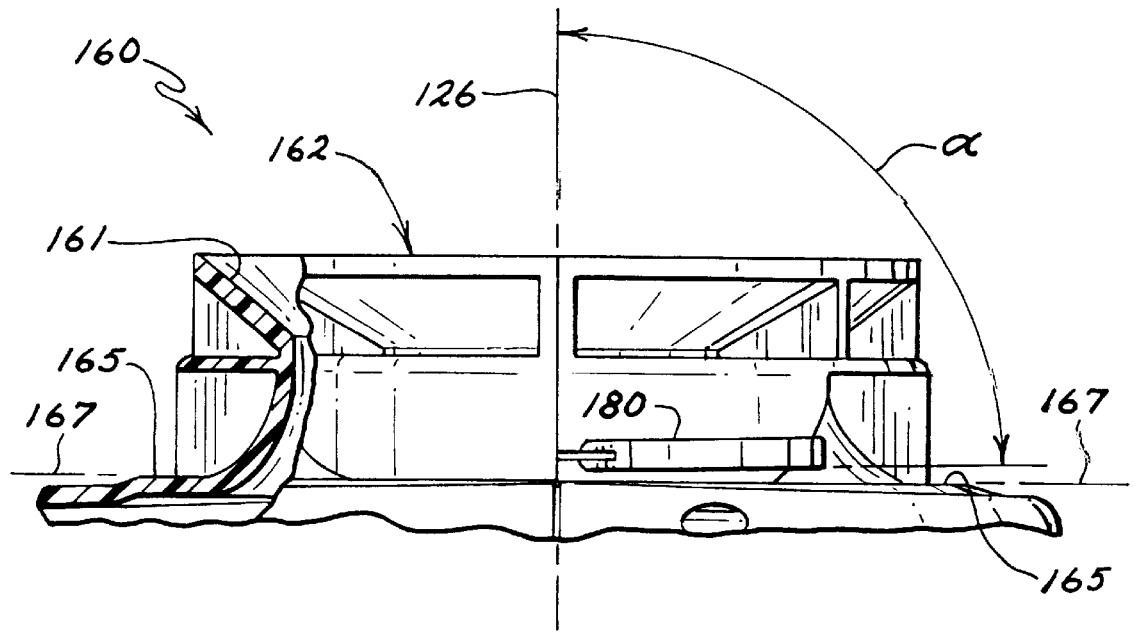
FIG. 17 is a front view of an alternate plenum 160.
Figure 18:
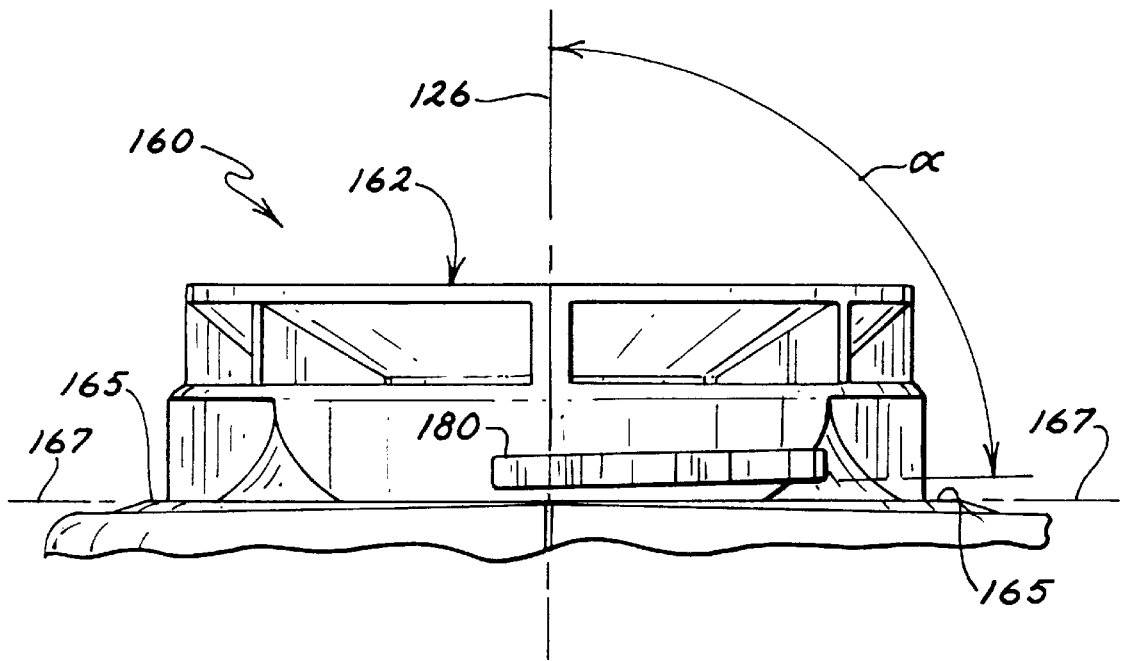
FIG. 18 is a rear view of the plenum of FIG. 17.
Figure 19:
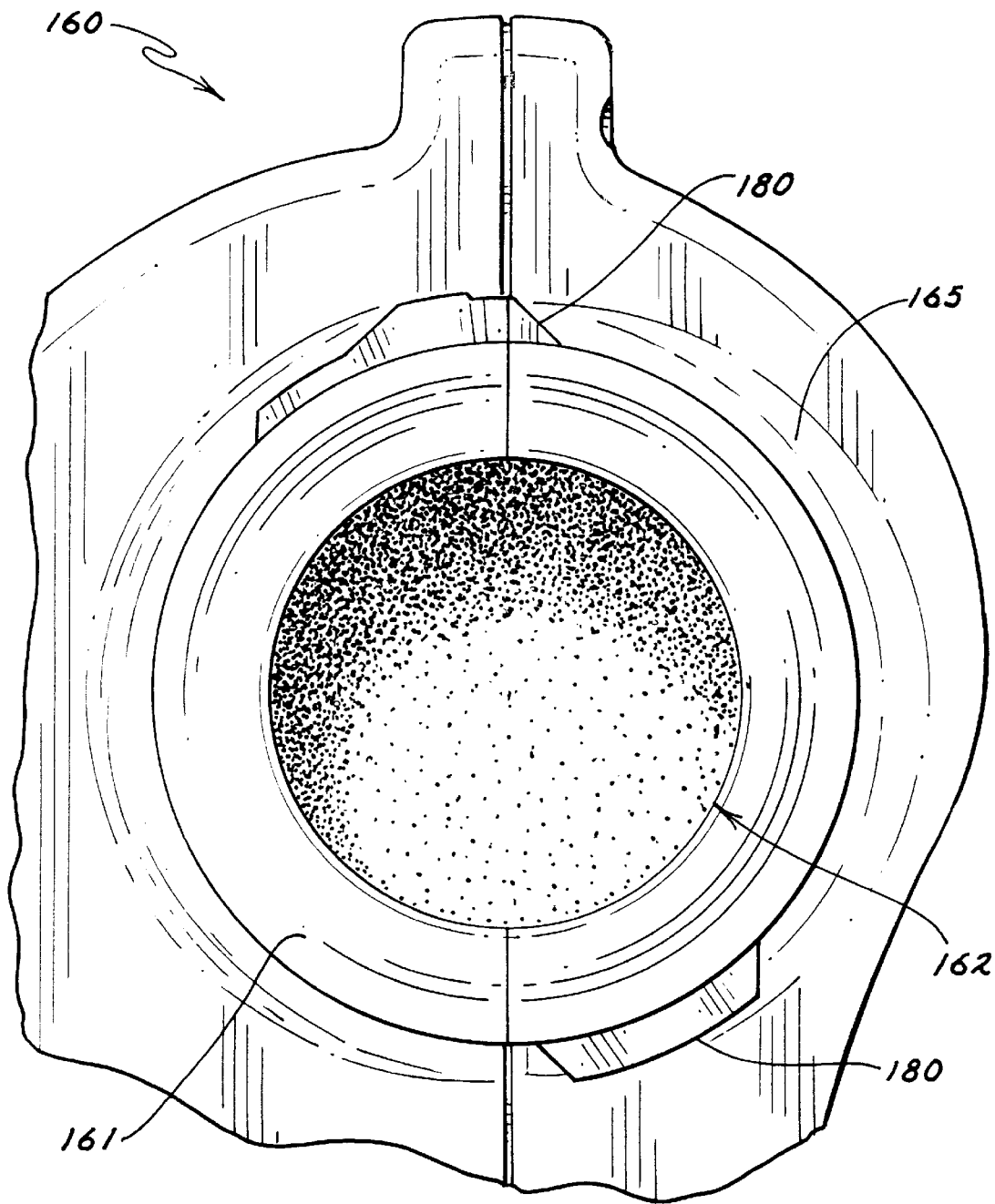
FIG. 19 is a top view of the plenum of FIGS. 17 and 18.

FIGS. 17, 18 and 19 depict enlarged portions of an alternate plenum 160 and portion of the housing of a portable blower assembly according to the present invention. In many respects, the plenum 160 is similar or identical to the plenum 60 described above. The variations between the plenums 60 and 160 can primarily be found in the area where the plenum 160 interfaces with the housing of the blower.

As discussed in U.S. Pat. No. 5,560,078 (Toensing et al.), the preferred removable plenums are attached and locked in place on the blower housing by rotation. With respect to the plenum 160, at least two engagement members 180 are provided about the plenum aperture 162. The engagement members 180 are designed to fit within slots (not shown) on the housing (see U.S. Pat. No. 5,560,078 for more details on one housing construction. After placing the engagement members 180 in the corresponding slots on the housing, the plenum 160 is rotated about an axis of rotation 126 to lock the plenum 160 in position on the housing. In the illustrated plenums 60 and 160, the axis of rotation about which the plenum is rotated is coincident with the axis of rotation of the impeller, although it will be understood that the two axes of rotation could be different. It is also preferred that the engagement members 180 have different shapes to prevent attachment of the plenum 160 to the housing in the wrong orientation.

Because the preferred plenum 160 is locked in position on the blower housing by rotational motion, both the housing and the plenum 160 have mating surfaces that generally define a plane perpendicular to the axis of rotation about which the plenum is rotated during locking and unlocking. The preferred plenum 160 includes a mating surface 165 in the form of a generally planar circular ring located about the plenum aperture 162 because the corresponding mating surface on the housing (not shown) is also generally planar. It will, however, be understood that the mating surface 165 of the plenum 160 could take any suitable shape based on the shape of the corresponding mating surface of the housing, for example, the mating surface could be frusto-conical, ribbed, etc. Regardless of the exact shape of the mating surface 165, it will define a plane that is substantially perpendicular to the axis about which the plenum 160 is rotated during locking and unlocking of the plenum 160. For the purposes of the present invention, the plane defined by the mating surface 165 will be defined as the seal plane 167.

The mating surface 165 on the plenum 160 and the corresponding mating surface on the housing provides one advantage in that by providing a more effective seal between the plenum 160 and the housing, the escape of acoustic energy through that interface can be reduced. Another advantage is that the remainder of the upper surface of the plenum 160, i.e., not the mating surface 165, can be provided with a draft angle that is helpful in separating a molded plenum 160 from its mold during manufacturing.

Another feature of the plenum 160 is the orientation of the engagement members 180 with respect to the axis of rotation 126. In the plenum 60 as described above, the preferred engagement members are oriented generally parallel to the seal plane and, as a result, they are oriented generally perpendicular to the axis about which the plenum 60 is rotated during locking and unlocking (because the seal plane is preferably perpendicular to the axis of rotation). The engagement members 180 of the plenum 160 are, however, offset from a perpendicular orientation with respect to the axis of rotation 126 of the plenum 160 by an angle α. In one preferred embodiment, the engagement members 180 are oriented at an angle of about 89.5 degrees from the axis of rotation 126 of the plenum 160.

One purpose of the angled orientation of the engagement members 180 is to draw the plenum 160 towards the housing as the plenum 160 is rotated about axis 126 during attachment of the plenum 160 to the housing. Where the plenum 160 includes a mating surface 165 as seen in FIGS. 17–19, the mating surface 165 is preferably forced against the corresponding mating surface of the housing to provide a tight connection between the plenum 160 and the housing.

Illustrative embodiments of the present invention are described above. Those skilled in the art will recognize that many embodiments are possible within the scope of the invention. Variations and modifications of the various parts and assemblies can certainly be made and still fall within the scope of the invention. As a result, the invention is to be limited only by the claims and equivalents of the invention described therein.

What is claimed is:

1. A portable blower comprising:
   a housing comprising a housing inlet and a housing outlet;
   an impeller mounted in the housing proximate the inlet, the impeller having a diameter, wherein rotation of the impeller about an axis of rotation draws air into the housing through the housing inlet, the air exiting the housing through the housing outlet;
   a plenum comprising a plenum aperture in fluid communication with the housing inlet and at least one plenum inlet opening allowing air to enter the plenum; and
   a sound absorbing element having a projected dimension in at least one direction perpendicular to the axis of rotation that is greater than the diameter of the impeller.

2. A portable blower according to claim 1, further comprising a mating surface about the plenum aperture, the mating surface defining a seal plane.

3. A portable blower according to claim 2, wherein the mating surface comprises a generally planar circular ring located in the seal plane.

4. A portable blower according to claim 1, further comprising at least two engagement members proximate the plenum aperture.

5. A portable blower according to claim 4, further comprising a mating surface about the plenum aperture, the mating surface defining a seal plane, wherein at least one of the engagement members is inclined relative to the seal plane.

6. A portable blower according to claim 1, wherein each of the plenum inlet openings further comprises a pair of louvers extending into the plenum.

7. A portable blower according to claim 6, wherein each pair of louvers includes an upper louver and a lower louver, the lower louver being located farther from the plenum aperture than the upper louver, and further wherein the lower louver extends into the plenum further than the upper louver.

8. A portable blower according to claim 1, wherein the height of the impeller from the sound absorbing element is about 100 millimeters or more.

9. A portable blower according to claim 1, wherein the height of the impeller from the sound absorbing element is about 125 millimeters or more.

10. A portable blower according to claim 1, wherein the sound absorbing element has a projected dimension in at least one direction perpendicular to the axis of rotation that is at least about 1.5 times the diameter of the impeller.

11. A portable blower according to claim 1, wherein the sound absorbing element has a thickness in a range of from about 8 millimeters to about 50 millimeters.

12. A portable blower according to claim 1, wherein the plenum is removably attachable over the housing inlet.

13. A portable blower comprising:
   a housing comprising a housing inlet and a housing outlet;
   an impeller mounted in the housing proximate the inlet, the impeller having a diameter, wherein rotation of the impeller about an axis of rotation draws air into the housing through the housing inlet, the air exiting the housing through the housing outlet;
   a plenum removably attachable to the housing, the plenum comprising a plenum aperture in fluid communication with the housing inlet and at least one plenum inlet opening allowing air to enter the plenum, a mating surface about the plenum aperture, the mating surface defining a seal plane, at least two engagement members located about the plenum aperture, wherein at least one of the engagement members is inclined relative to the seal plane; and
   a sound absorbing element having a dimension in at least one direction perpendicular to the axis of rotation that is greater than the diameter of the impeller.

14. A portable blower according to claim 13, wherein the mating surface comprises a generally planar circular ring located in the seal plane.

15. A portable blower according to claim 13, wherein each of the plenum inlet openings further comprises an upper louver and a lower louver, the lower louver being located farther from the plenum aperture than the upper louver, and further wherein the lower louver extends into the plenum further than the upper louver.

16. A portable blower according to claim 13, wherein the height of the impeller from the sound absorbing element is about 100 millimeters or more.

17. A portable blower according to claim 13, wherein the sound absorbing element has a dimension in at least one direction perpendicular to the axis of rotation that is at least about 1.5 times the diameter of the impeller.

18. A portable blower comprising:
   a housing comprising a housing inlet and a housing outlet;
   an impeller mounted in the housing proximate the inlet, the impeller having a diameter, wherein rotation of the impeller about an axis of rotation draws air into the housing through the housing inlet, the air exiting the housing through the housing outlet;
   a plenum comprising a plenum aperture in fluid communication with the housing inlet and at least one plenum inlet opening allowing air to enter the plenum; and
   a sound absorbing element having a projected dimension in at least one direction perpendicular to the axis of rotation that is greater than the diameter of the impeller, wherein the height of the impeller from the sound absorbing element is in a range of from about 100 millimeters to about 150 millimeters or more, and further wherein the sound absorbing element has a thickness in a range of from about 8 millimeters to about 50 millimeters.

19. A portable blower according to claim 18, wherein the sound absorbing element has a projected dimension in at least one direction perpendicular to the axis of rotation that is at least about 1.5 times the diameter of the impeller.

20. A portable blower according to claim 18, wherein the plenum further comprises a mating surface about the plenum aperture, the mating surface defining a seal plane, at least two engagement members located about the plenum aperture, wherein at least one of the engagement members is inclined relative to the seal plane.

* * * * *